United States Patent
Dunne et al.

(10) Patent No.: US 9,641,904 B2
(45) Date of Patent: *May 2, 2017

(54) USE OF SIMULTANEOUSLY RECEIVED VIDEOS BY A SYSTEM TO GENERATE A QUALITY OF EXPERIENCE VALUE

(71) Applicants: International Business Machines Corporation, Armonk, NY (US); University College Dublin, Belfield (IE)

(72) Inventors: Jonathan Dunne, Dungarvan (IE); Paul B. French, Cork (IE); James P. Galvin, Jr., Georgetown, KY (US); Patrick McDonagh, Churchtown (IE); Patrick J. O'Sullivan, Ballsbridge (IE)

(73) Assignees: INTERNATIONAL BUSINESS MACHINES CORPORATION, Armonk, NY (US); UNIVERSITY COLLEGE DUBLIN, Belfield, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,894

(22) Filed: Mar. 25, 2016

(65) Prior Publication Data

US 2016/0212497 A1    Jul. 21, 2016

Related U.S. Application Data (63) Continuation of application No. 14/230,489, filed on Mar. 31, 2014, now Pat. No. 9,300,992, which is a
(Continued)

(51) Int. Cl.
*H04H 20/14* (2008.01)
*H04H 60/29* (2008.01)
(Continued)

(52) U.S. Cl.
CPC ... *H04N 21/6125* (2013.01); *H04L 29/06523* (2013.01); *H04N 17/004* (2013.01);
(Continued)

(58) Field of Classification Search
CPC .......... H04N 21/2404; H04N 21/4348; H04N 21/2402; H04N 21/2662; H04N 21/64322;
(Continued)

(56) References Cited

U.S. PATENT DOCUMENTS 4,547,804 A   10/1985   Greenberg
4,805,020 A   2/1989   Greenberg
(Continued)

FOREIGN PATENT DOCUMENTS

WO   2011158221 A2   12/2011
WO   2012102973 A1   8/2012

OTHER PUBLICATIONS

"Quality of Experience for Mobile Video Users," [online] Dialogic Corporation White Paper No. 11681-01, Dec. 2009, retrieved from the Internet: <http://www.dialogic.com/~/media/products/docs/whitepapers/11681-qoe-mobile-video-wp.pdf>, 12 pg.
(Continued)

*Primary Examiner* — Nnenna Ekpo
(74) *Attorney, Agent, or Firm* — Cuenot, Forsythe & Kim, LLC (57) ABSTRACT

A first instance of a reference video is stored. A primary video and a second instance of the reference video are simultaneously received. At least one quality of experience value that infers a perceptual quality of the primary video as received by a system is generated by comparing the first instance of the reference video to the second instance of the reference video on a pixel-by-pixel, frame-by-frame, basis and determining whether each pixel and each frame con-
(Continued)

tained in the first instance of the reference video are contained in the second instance of the reference video.

14 Claims, 5 Drawing Sheets

Related U.S. Application Data continuation of application No. 14/079,083, filed on Nov. 13, 2013, now Pat. No. 9,300,991.

(51) Int. Cl.
| | |
|---|---|
| H04N 21/61 | (2011.01) |
| H04N 21/24 | (2011.01) |
| H04N 21/434 | (2011.01) |
| H04N 21/2662 | (2011.01) |
| H04N 21/643 | (2011.01) |
| H04N 21/647 | (2011.01) |
| H04L 29/06 | (2006.01) |
| H04N 17/02 | (2006.01) |
| H04N 21/426 | (2011.01) |
| H04N 17/00 | (2006.01) |
| H04N 19/895 | (2014.01) |
| H04N 21/234 | (2011.01) |

(52) U.S. Cl.
CPC ........... *H04N 17/02* (2013.01); *H04N 19/895* (2014.11); *H04N 21/23418* (2013.01); *H04N 21/2402* (2013.01); *H04N 21/2404* (2013.01); *H04N 21/2662* (2013.01); *H04N 21/42615* (2013.01); *H04N 21/4347* (2013.01); *H04N 21/4348* (2013.01); *H04N 21/647* (2013.01); *H04N 21/64322* (2013.01); *H04N 21/64738* (2013.01)

(58) Field of Classification Search
CPC ......... H04N 21/6473; H04N 21/64738; H04N 21/64792; H04N 21/2343
USPC ..................... 725/16, 19, 22, 109, 146, 147; 375/240.27
See application file for complete search history.

(56) References Cited

U.S. PATENT DOCUMENTS

| | | | |
|---|---|---|---|
| 5,621,454 A | 4/1997 | Ellis et al. | |
| 6,035,177 A | 3/2000 | Moses et al. | |
| 6,154,771 A | 11/2000 | Rangan et al. | |
| 6,388,712 B1 | 5/2002 | Shinohara et al. | |
| 6,963,975 B1 | 11/2005 | Weare | |
| 7,194,752 B1 | 3/2007 | Kenyon et al. | |
| 7,277,766 B1 | 10/2007 | Khan et al. | |
| 7,287,275 B2 | 10/2007 | Moskowitz | |
| 7,289,643 B2 | 10/2007 | Brunk et al. | |
| 7,460,994 B2 | 12/2008 | Herre et al. | |
| 7,899,114 B2 | 3/2011 | Kostrzewski et al. | |
| 8,156,132 B1 | 4/2012 | Kaminski, Jr. | |
| 8,176,508 B2 * | 5/2012 | Franklin | H04H 20/14 725/146 |
| 8,401,067 B2 | 3/2013 | Kim et al. | |
| 8,904,022 B1 * | 12/2014 | King | H04N 21/6408 709/219 |
| 9,300,991 B2 | 3/2016 | Dunne et al. | |
| 9,300,992 B2 | 3/2016 | Dunne et al. | |
| 2001/0046297 A1 | 11/2001 | Kasai et al. | |
| 2005/0149964 A1 | 7/2005 | Thomas et al. | |
| 2006/0233442 A1 * | 10/2006 | Lu | G06K 9/00711 382/190 |
| 2007/0271590 A1 * | 11/2007 | Gulas | H04L 65/4069 725/118 |
| 2010/0037281 A1 | 2/2010 | Bennett | |
| 2010/0231797 A1 * | 9/2010 | Jiang | H04N 19/895 348/607 |
| 2012/0083220 A1 * | 4/2012 | Rodermund | H04W 24/00 455/67.11 |
| 2012/0151009 A1 | 6/2012 | Bouazizi et al. | |
| 2012/0311126 A1 | 12/2012 | Jadallah et al. | |
| 2013/0031575 A1 * | 1/2013 | Gallant | H04L 41/5038 725/20 |
| 2013/0133011 A1 * | 5/2013 | Chhaochharia | H04L 47/24 725/62 |
| 2013/0148741 A1 | 6/2013 | Steinberg et al. | |
| 2015/0067184 A1 * | 3/2015 | Parthasarathy | H04L 65/60 709/231 |
| 2015/0071612 A1 | 3/2015 | Ruegg et al. | |
| 2015/0135245 A1 | 5/2015 | Dunne et al. | |
| 2015/0135246 A1 | 5/2015 | Dunne et al. | |
| 2015/0187333 A1 * | 7/2015 | Loeffler | G06F 3/1438 345/1.3 |

OTHER PUBLICATIONS

"Testing MPEG based IP video QoE/QoS," [online] Shenick Network Systems White Paper, 2007, retrieved from the Internet: <www.shenick.com/.../Testing_MPEG_based_IP_video_by_Shenick.pd>, 16 pg.

U.S. Appl. No. 14/079,083, Non-Final Office Action, Jun. 25, 2015, 14 pg.

U.S. Appl. No. 14/079,083, Notice of Allowance, Dec. 23, 2015, 13 pg.

U.S. Appl. No. 14/230,489, Non-Final Office Action, Jun. 25, 2015, 18 pg.

U.S. Appl. No. 14/230,489, Notice of Allowance, Dec. 18, 2015, 11 pg.

* cited by examiner

USE OF SIMULTANEOUSLY RECEIVED VIDEOS BY A SYSTEM TO GENERATE A QUALITY OF EXPERIENCE VALUE

BACKGROUND

Arrangements described herein relate to streaming of video content over Internet Protocol (IP) based communication networks.

Internet Protocol television (IPTV) is a system through which television services are delivered using the Internet protocol suite over a packet-switched network, such as the Internet, instead of being delivered through traditional terrestrial, satellite signal, and cable television formats. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment. Nonetheless, both IPTV and Internet television may be transmitted over the Internet using IP based communications.

SUMMARY

A method includes storing a first instance of a reference video. The method further includes simultaneously receiving a primary video and a second instance of the reference video. The method also includes generating, using a processor, at least one quality of experience value that infers a perceptual quality of the primary video as received by a system by comparing the first instance of the reference video to the second instance of the reference video on a pixel-by-pixel, frame-by-frame, basis and determining whether each pixel and each frame contained in the first instance of the reference video are contained in the second instance of the reference video.

Another method includes simultaneously transmitting a primary video and a second instance of a reference video to a system, the second instance of the reference video configured to be compared to a first instance of the reference video stored by the system on a pixel-by-pixel, frame-by-frame, basis to determine whether each pixel and each frame contained in the first instance of the reference video are contained in the second instance of the reference video, wherein at least one quality of experience value that infers a perceptual quality of the primary video as received by the system is generated based on the comparison. The method further includes receiving from the system the at least one quality of experience value that infers the perceptual quality of the primary video as received by the system. The method also includes, based on the at least one quality of experience value that infers the perceptual quality of the primary video as received by the system, implementing in real time, using a processor, at least one corrective action to improve the perceptual quality of the primary video.

A system includes a processor programmed to initiate executable operations. The executable operations include storing a first instance of a reference video. The executable operations further include simultaneously receiving a primary video and a second instance of the reference video. The executable operations also include generating at least one quality of experience value that infers a perceptual quality of the primary video as received by the system by comparing the first instance of the reference video to the second instance of the reference video on a pixel-by-pixel, frame-by-frame, basis and determining whether each pixel and each frame contained in the first instance of the reference video are contained in the second instance of the reference video.

A computer program includes a computer readable storage medium having program code stored thereon. The program code is executable by a processor to perform a method. The method includes storing, by the processor, a first instance of a reference video. The method further includes simultaneously receiving, by the processor, a primary video and a second instance of the reference video. The method also includes generating, by the processor, at least one quality of experience value that infers a perceptual quality of the primary video as received by a system by comparing the first instance of the reference video to the second instance of the reference video on a pixel-by-pixel, frame-by-frame, basis and determining whether each pixel and each frame contained in the first instance of the reference video are contained in the second instance of the reference video.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

Arrangements described herein relate to streaming of video content over internet protocol (IP) based communication networks. Existing digital video broadcasting systems, such as cable and satellite systems, have a dedicated infrastructure which strives to provide error-free delivery of video content. In the case of internet protocol television (IPTV), however, digital broadcasting shares its network infrastructure with other IP based services, such as voice over IP (VoIP) and IP data services. Variations in the ability of bandwidth and queue lengths adversely affect the ability to deliver IPTV services with minimal delay and without information loss.

In accordance with the inventive arrangements disclosed herein, a reference video is streamed to a video display system in parallel with of a primary video being streamed to the video display system. The primary video contains media content being presented to one or more users via the video display system. The reference video, however, need not be displayed. Instead, the reference video is processed to determine whether any quality of experience (QoE) issues exist with the primary video. Specifically, the reference video can be one instance (e.g., a second instance) of a video to which another instance (e.g., a first instance) of the same video, which may be stored locally on the video display system, is compared. By comparing the first instance of the reference video to the second instance, frames and/or pixels corrupted in the second instance of the video, or lost, during transmission can be identified. Based on this comparison, a QoE value can be generated that indicates a quality of the second instance of the reference video. For example, if no frames or pixels are corrupted or lost, the QoE value can be a high value. If all frames are lost, the QoE can be a low value. If some frames or pixels are lost or corrupted, the QoE value can be some value between the low value and the high value.

Since the second instance of the reference video is communicated in parallel with the primary video, it is reasonable to assume that any transmission errors occurring in the transmission of the second instance of the video also may occur in the transmission of the primary video. Accordingly, the QoE value can infer a perceptual quality of the primary video as received by the video display system. The video display system can communicate the QoE value to a video server providing the primary video and/or to a QoE management entity that manages transmission of the primary video. If the QoE value is less than a threshold value, the video server and/or QoE management entity can automatically implement, in real time, a corrective action to improve the perceptual quality of the primary video. For example, greater bandwidth can be allocated for transmission of video to the video display system, the video can be routed through different nodes of a communication network, error protection schemes can be implemented or changed, etc.

Several definitions that apply throughout this document now will be presented.

As defined herein, the term "quality of experience," also represented by the acronym "QoE," means is a quality of a video with regard to how the content of the video is, or would be, subjectively perceived by a user viewing the video content. A video need not actually be presented to a user to determine a QoE value for the video, however. Instead, various metrics can be generated based on, for example, lost and/or corrupted frames and/or pixels occurring during transmission of the video. Other metrics also can be generated to determine a QoE value and the present arrangements are not limited in this regard.

As defined herein, the term "primary video" means a video comprising video content transmitted to a video display system for presentation to one or more users by the video display system.

As defined herein, the term "reference video" means a video comprising video content for use in generating a quality of experience value that infers a perceptual quality of a primary video.

As defined herein, the term "simultaneously transmit" means to transmit at least one video while another video is being transmitted. For example, data packets for one video can be interspersed between data packets for another video. In another example, data packets may include data from each of the videos.

As defined herein, the term "simultaneously receive" means to receive at least one video while another video is being received. For example, data packets for one video can be interspersed between data packets for another video. In another example, data packets may include data from each of the videos.

As defined herein, the term "user" means a person (i.e., human being), for example a person using a device and/or system described herein.

As defined herein, the term "real time" means a level of processing responsiveness that a user or system senses as sufficiently immediate for a particular process or determination to be made, or that enables the processor to keep up with some external process.

As defined herein, the term "metric" means a value generated based on a measurement and/or comparison that is made.

As defined herein, the term "computer readable storage medium" means a storage medium that contains or stores program code for use by or in connection with an instruction execution system, apparatus, or device. As defined herein, a "computer readable storage medium" is not a transitory propagating signal per se.

As defined herein, the term "processor" means at least one integrated circuit configured to carry out instructions of program code. Examples of a processor include, but are not limited to, a central processing unit (CPU), an array processor, a vector processor, a field-programmable gate array (FPGA) and a controller.

Figure 1:
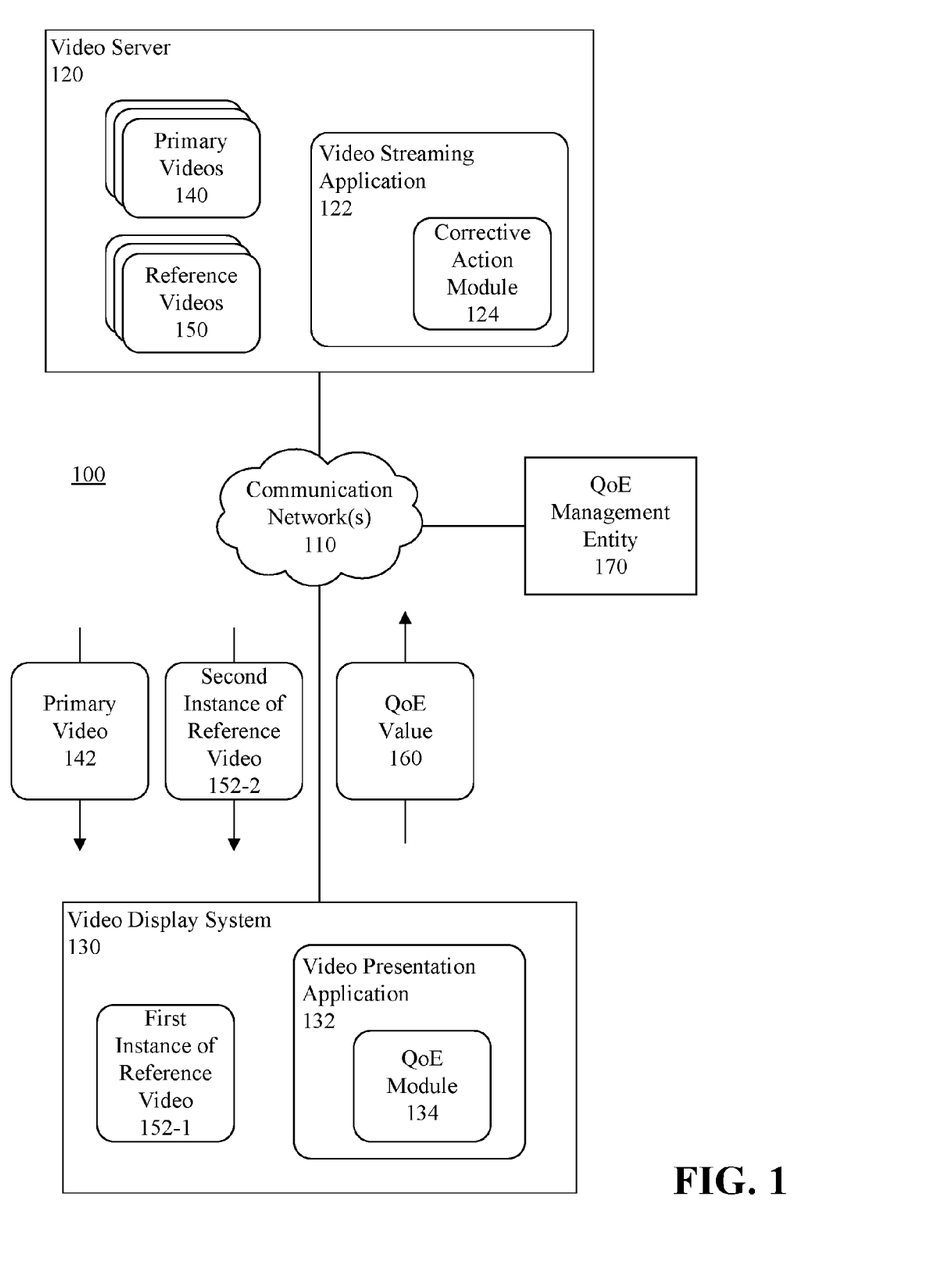
FIG. 1 is a block diagram illustrating an example of a communication system in which a QoE value is generated.

FIG. 1 is a block diagram illustrating an example of a communication system (hereinafter "system") 100 in which a QoE value is generated. The system 100 can include a video display system 130 configured to receive videos from at least one video server 120 via one or more communication networks 110, and present the videos to one or more users. The communication network(s) 110 provide the medium used to provide communications links between various nodes of the system 100, such as the video display system 130 and the video server 120. The communication network(s) 110 may include connections, such as wire, wireless communication links, and/or fiber optic cables. The communication network(s) 110 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), and/or the like. In this regard, the communication network(s) 110 can include one or more trunk lines, routers, switches, transceivers and/or the like. The communication network(s) 110 can support Internet Protocol (IP) communications through which various IP based services may be provided. These services may include, but are not limited to, Internet television, Internet Protocol television (IPTV) and Web television (Web TV).

The video server 120 can include at least processing system, which includes at least one processor and memory, configured to transmit primary videos 140 and reference videos 150 to video display systems, such as the video display system 130, via the communication network(s) 110. In one arrangement, the video server 120 can comprise a plurality of processing systems communicatively linked via a communication network, such as the communication network(s) 130. The video server 120 can include a video streaming application 122 configured to stream videos 140, 150 to client devices, such as the video display system 130. The video streaming application 122 can include a corrective action module 124 configured to process QoE values received from the client devices. When a QoE value infers that perceptual quality of a primary video 140 as received by a client device is less than optimal, the corrective action module 124 can implement corrective actions to improve the quality of transmission, as will be further described herein.

In one aspect, the video server 120 can provide the videos 140, 150 as Internet television transmissions, IPTV transmissions or Web TV transmissions. The primary videos 140 include both video content and audio content. The reference videos 150 include video content and can include audio content, but this need not be the case.

The video display system 130 can be a terminal node of the communication network(s) 110. For example, the video display system 130 can be a set-top box (e.g., an IPTV receiver), a television, a computer (e.g., a desktop computer, a workstation, a notebook computer, a laptop computer, a tablet computer, a netbook, etc.), a smart phone, or any other system, device or apparatus configured to receive videos via a communication network and present the videos to one or more users. In this regard, the video display system 130 can include a display, or can be communicatively linked to a display, via which the video display system 130 presents the videos. The video display system 130 can include a video presentation application 132 that processes primary videos 140 received via the communication network(s) 110, for example from the video server 120, and processes the primary videos 140 for presentation on the display. Such processing can include both audio and video processing. Further, the video presentation application 132 can include a QoE module 134 that generates QoE values based on comparing different instances of reference videos 150, as will be described herein. As noted, the QoE values can infer perceptual qualities of the primary videos 140 as received by the video di splay system 130.

In illustration, when transmitting a particular primary video 142 to the video display system 130 via the communication network(s) 110, the video server 120 can, in parallel, also transmit a particular reference video 152 to the video display system 130. In one arrangement, the video server 120 can multiplex both the primary video 142 and the reference video 152 into a single data stream. In another arrangement, the video server 120 can transmit the primary video 142 in a first data stream and transmit the reference video 152 in a second data stream. The reference video 152 may not be as long as the primary video 142. Hence, transmission of the reference video 152 may complete while transmission of the primary video 142 continues. In one aspect, transmission of the reference video 152 can repeat, any number of times, while the primary video 142 is still transmitting, as is further described herein.

In one arrangement, the video server 120 can select reference video 152 from the reference videos 150 based on a type of the primary video 142. For example, if the primary video 142 comprises numerous action sequences in the video content, the reference video 152 that is selected also can comprise numerous action sequences in the video content. Similarly, if the primary video 142 is a documentary comprising numerous interviews of people, the reference video 152 that is selected also can comprise at least one interview. Accordingly, the compression rate of the videos 142, 152 likely will be similar. In illustration, if the primary video 142 and reference video 152 are compressed into a particular Moving Picture Experts Group (MPEG) format, such as MPEG-4, action sequences may require more data for each predicted picture (P-frame) and bi-predictive picture (B-frame) than non-action action sequences. Thus, if the primary video 142 includes many action sequences, selecting the reference video 152 to have at least one action sequence can ensure that the reference video 152 represents a relatively good approximation of the amount of data contained in the P-frames and B-frames of the primary video 142, and thus the amount of bandwidth used for transmission of these frame. Further, the number of lost or corrupted frames and/or lost or corrupted pixels in the reference video 152, as well as the impact of such, can infer the number of lost or corrupted frames and/or lost or corrupted pixels in the primary video 142 and the resulting impact on video presentation quality.

Stored on and/or by the video display system 130 can be another instance of the reference video 152. Indeed, the video display system 130 can store an instance of each of the reference videos 150 that potentially may be transmitted to the video display system 130 with primary videos 140. In this regard, each of the instances of the reference videos 150 stored on by the video display system 130 can correspond to a respective type of primary video 140 anticipated to be received by the video display system 130.

For purposes of explanation, hereinafter the instance of the reference video 152 stored by the video display system 130 will be referred to as the "first instance of reference video 152-1" or, more simply, "first instance 152-1," and the instance of the reference video 152 received from the video server 120 will be referred to as the "second instance of reference video 152-2" or, more simply, "second instance 152-2." In one arrangement, the video display system 130 can receive the first instance 152-1 from the video server 120 prior to the primary video 142 being received. In another arrangement, the reference video 152 can be a standardized video and the first instance 152-1 can stored to the video display system 130 a priori. For example, the first instance 152-1 can be stored by the video display system 130 when the video presentation application 132 is installed.

In operation, the video display system 130 can receive the primary video 142 and the second instance of reference video 152-2 from the video server 120 via the communication network(s) 110. In an arrangement in which the primary video 142 and second instance of reference video 152-2 are multiplexed into a single data stream, the video display system can de-multiplex the data stream to extract the primary video and the second instance of reference video 152-2. Further, the video display system 130 also can decompress the primary video 142 and the second instance of reference video 152-2. Such processing can be performed by the video presentation application 132. The video presentation application 132 also can begin presentation of the primary video 142 on a display.

While decompressing the second instance of reference video 152-2, the video presentation application 132 also can decompress the first instance of reference video 152-1, and the QoE module 134 can compare the first instance 152-1 to the second instance 152-2 on a frame-by-frame, pixel-by-pixel, basis and determine whether each pixel and each frame contained in the first instance 152-1 is contained in the second instance 152-2. Suitable markers or identifiers contained in the reference video 152 can be identified and used to synchronize the first instance 152-1 and the second instance 152-2 when performing the comparison.

Figure 2:
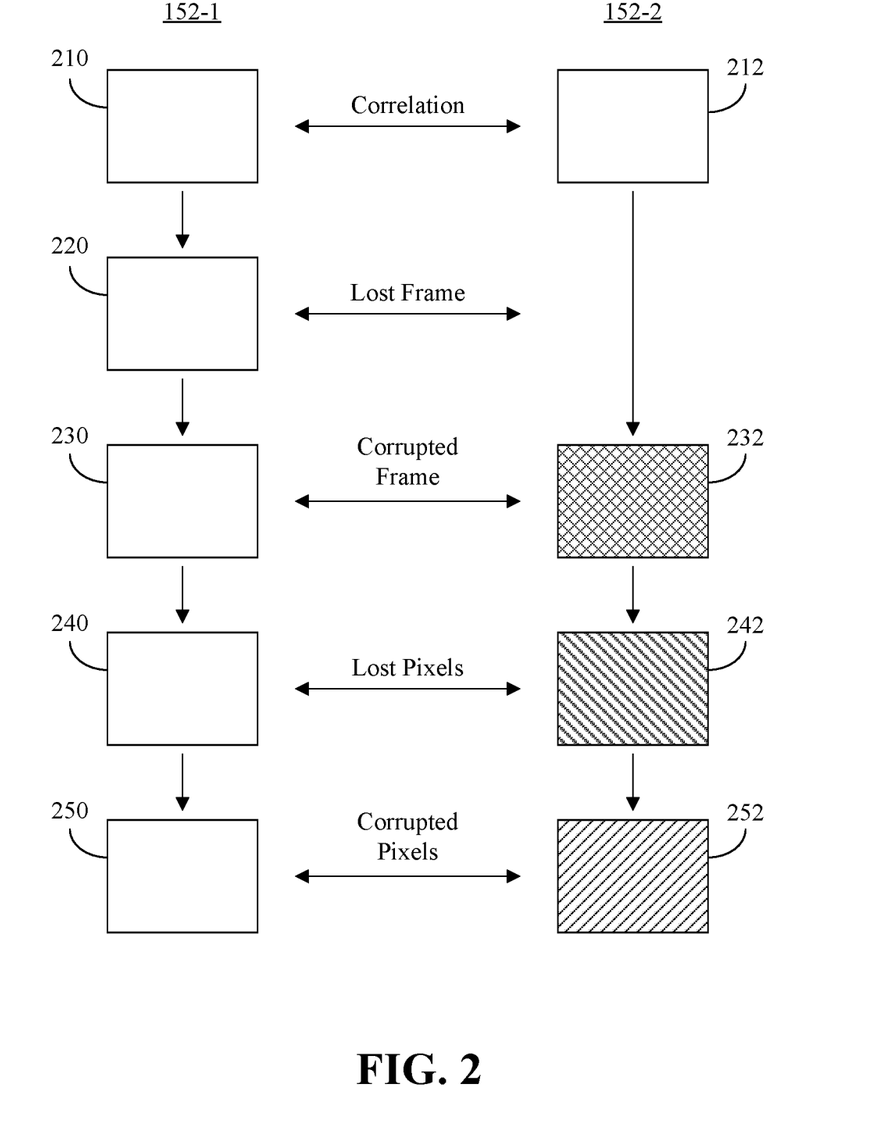
FIG. 2 depicts frames of a first instance of reference video and frames of a second instance of reference video.

FIG. 2 depicts frames of the first instance of reference video 152-1 and frames of the second instance of reference video 152-2. Referring to FIGS. 1 and 2, the QoE module 134 can identify a first identifier or marker contained in the second instance 152-2, and identify the same identifier or marker contained in the first instance 152-2. The QoE module 134 can identify the first frame 210 contained in the first instance 152-1 following the identifier or marker, and determine whether that same frame 212 is contained in the second instance 152-2. If not, this can indicate that the frame 212 was lost during transmission of the second instance 152-2. If the frame 212 was not lost, the QoE module 134 further can determine whether the frame 212 is corrupted in the second instance 152-2 (e.g., determine whether the frame has sufficient structure to be rendered). If the frame 212 is not lost and not corrupted, the QoE module 134 can determine whether each pixel contained in the frame 210 is contained in the frame 212. Further, the QoE module 134 can determine whether any of the pixels are corrupted (e.g., not renderable). Optionally, the value assigned to each pixel contained in the frame 210 can be compared to the value assigned to a corresponding pixel contained in the frame 212 to determine whether the pixel values match. If each of the pixels contained in the frame 210 are present in the frame 212, none of the pixels are corrupted and, optionally, the values assigned to corresponding pixels match, then the frames 210, 212 can be considered to correlate, as depicted in the example of FIG. 2, and a corresponding metric can be generated for use in generating at least one QoE value 160.

In this example, the first instance of reference video 152-1 includes a frame 220, but a corresponding frame is not included in the second instance 152-2. This can indicate a lost frame in the second instance of the reference video 152-1 and a corresponding metric can be generated based on identifying the lost frame. Continuing with the example, a frame 232 contained in the second instance 152-2 that corresponds to a frame 230 contained in the first instance 152-1 can be found to be corrupted, and a corresponding metric can be generated based on identifying that the frame 232 is corrupted. Further, a frame 242 contained in the second instance 152-2 that corresponds to a frame 240 contained in the first instance 152-1 can be found not to be corrupted, but to have lost pixels. A corresponding metric can be generated based on identifying that there are lost pixels and how many pixels are lost. Also, a frame 252 contained in the second instance 152-2 that corresponds to a frame 250 contained in the first instance 152-1 can be found not to be corrupted, and not to have lost pixels, but one or more pixels can be corrupted. Again, a corresponding metric can be generated based on identifying that there are corrupted pixels and how many pixels are corrupted. Some frames may have both lost pixels and corrupted pixels, and a corresponding metric can be generated. The process of verifying each frame and each pixel can continue until each frame contained in first instance of reference video 152-1 has been compared to the second instance 152-2 as described.

In addition to frame-by-frame, pixel-by-pixel comparison of the first instance of reference video 152-1 to the second instance 152-2, other frame information also can be compared and corresponding metrics can be generated. For example, frame headers, frame footers and other information in the first instance of reference video 152-1 can be compared to corresponding information in the second instance 152-2.

Based on the generated metrics, the QoE module 134 can generate test results and process the test results to generate at least one QoE value 160. As noted, since the second instance of reference video 152-2 is communicated in parallel with the primary video 142, it is reasonable to assume that any transmission errors occurring in the transmission of the second instance 152-2 also may occur in the transmission of the primary video 142. Accordingly, the QoE value 160 can infer a perceptual quality of the primary video 142 as received by the video display system.

The video display system 130 can communicate the QoE value 160 to the video server 120. For example, the video display system 130 can communicate the QoE value 160 to the video server 120 in response to the QoE value 160 being generated, or store the QoE value 160 to a storage medium and provide the QoE value 160 to the video server 120 in response to a polling request received from the video server 120. In lieu of, or in addition to, communicating the QoE value 160 to the video server 120, the video display system 130 can communicate the QoE value 160 to a QoE management entity 170, such as another server or system that participates in transmission of the primary video 142 to the video display system 130. The QoE management entity 170 can be, for example, infrastructure of the communication network(s) 110.

If the QoE value 160 is less than a threshold value, the video server 120 (e.g., the corrective action module 124) and/or the QoE management entity 170 can automatically implement, in real time, at least one corrective action to improve the perceptual quality of the primary video 142. For example, greater bandwidth can be allocated for transmission of primary video 142 to the video display system 130, the primary video 142 can be routed through different nodes of the communication network(s) 110, error protection schemes can be implemented or changed, etc.

This process can repeat while the primary video 142 continues to be streamed to the video display system. In one arrangement, when each successive transmission of the second instance of reference video 152-2 is communicated to the video display system 130 can be based on the QoE value 160. For example, if the QoE value 160 is greater than a particular threshold value, the next transmission of the second instance of reference video 152-2 may commence ten minutes after the previous transmission has completed. If, however, the QoE value 160 is relatively low, the next transmission of the second instance of reference video 152-2 may commence very soon after, or immediately after, the previous transmission has completed. For example, the second instance of reference video 152-2 may be looped in a data stream so as to continuously repeat. Accordingly, a determination can be made as to whether any corrective actions taken to improve the perceptual quality of the primary video 142 have been successful. Each time the second instance 152-2 is re-transmitted, a new QoE value can be generated and communicated to the video server and/or the QoE management entity 170 as described.

Figure 3:
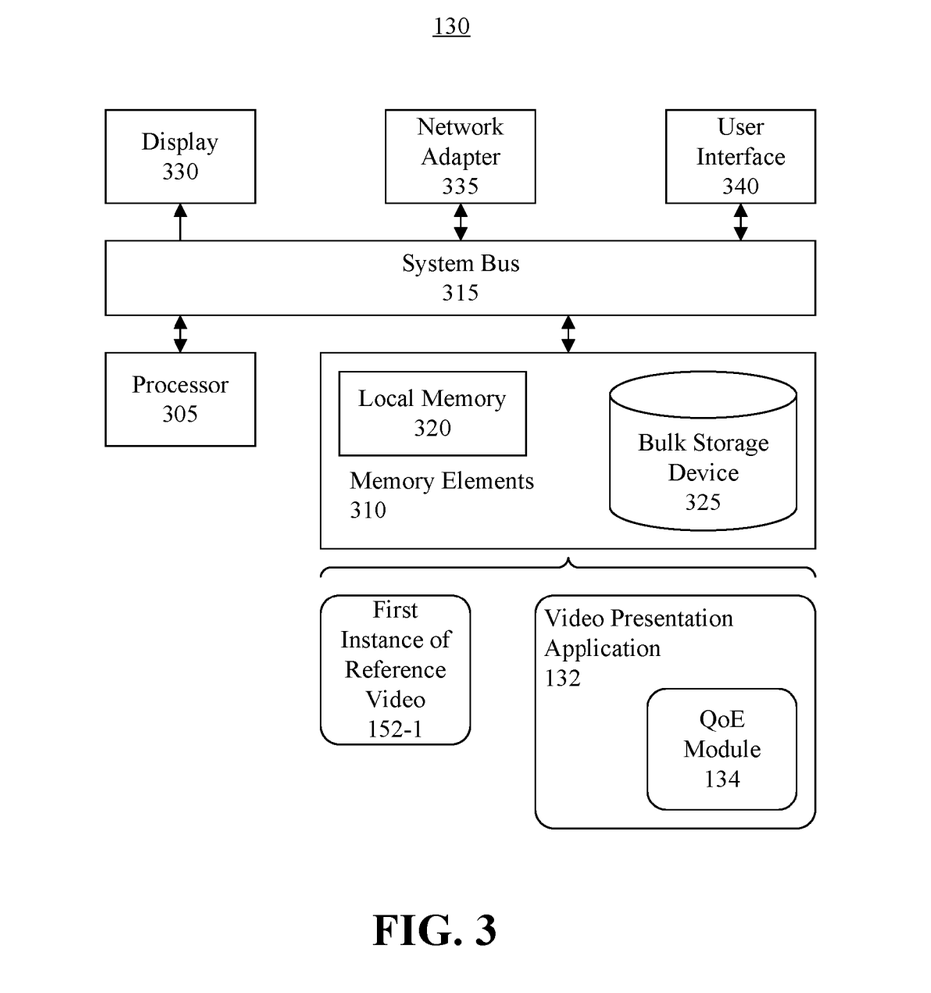
FIG. 3 is a block diagram illustrating example architecture of a video display system.

FIG. 3 is a block diagram illustrating example architecture of the video display system 130. The video display system 130 can include at least one processor 305 coupled to memory elements 310 through a system bus 315 or other suitable circuitry. As such, the video display system 130 can store program code within the memory elements 310. The processor 305 can execute the program code accessed from the memory elements 310 via the system bus 315. It should be appreciated that the video display system 130 can be implemented in the form of any system including a processor and memory that is capable of performing the functions and/or operations described within this specification with regard to the video display system 130.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The video display system 130 also can include one or more cache memories (not shown) that provide temporary storage of at least some program code in order to reduce the number of times program code must be retrieved from the bulk storage device 325 during execution.

A display 330 can be coupled to the video display system 130. The display 330 can be coupled to the video display system 130. For example, the display 330 can be coupled to the video display system 130 via a graphics processing unit (GPU), which may be a component of the processor 305 or a discrete device. Optionally, the video display system 130 further can include one or more output audio transducers and/or output audio interfaces. One or more network adapters 335 also can be coupled to video display system 130 to enable video display system 130 to become coupled to other systems, such as the video server 120, and/or remote storage devices. Modems, cable modems, transceivers, and Ethernet cards are examples of different types of network adapters 335 that can be used with video display system 130. The video display system 130 also can include a user interface 340 configured to receive user inputs to access and display videos. The user interface can include one or more input/output (I/O) devices, for example a radio frequency (RF) and/or infrared (IR) receiver or transceiver configured to receive RF and/or IR signals from a remote control or other wireless device, one or more input ports configured to receive signals from a keyboard, a mouse, a touch pad, a touch screen, or the like, etc.

As pictured in FIG. 3, the memory elements 310 can store the components of the video display system 130 of FIG. 1, namely the first instance of reference video 152-1 and the video presentation application 132 which, as noted, can include the QoE module 134. Being implemented in the form of executable program code, the video presentation application 132 and the QoE module 134 can be executed by the video display system 130 and, as such, can be considered part of the video display system 130. Moreover, the first instance of reference video 152-1, the video presentation application 132 and the QoE module 134 are functional data structures that impart functionality when employed as part of the video display system 130 of FIG. 3.

Figure 4:
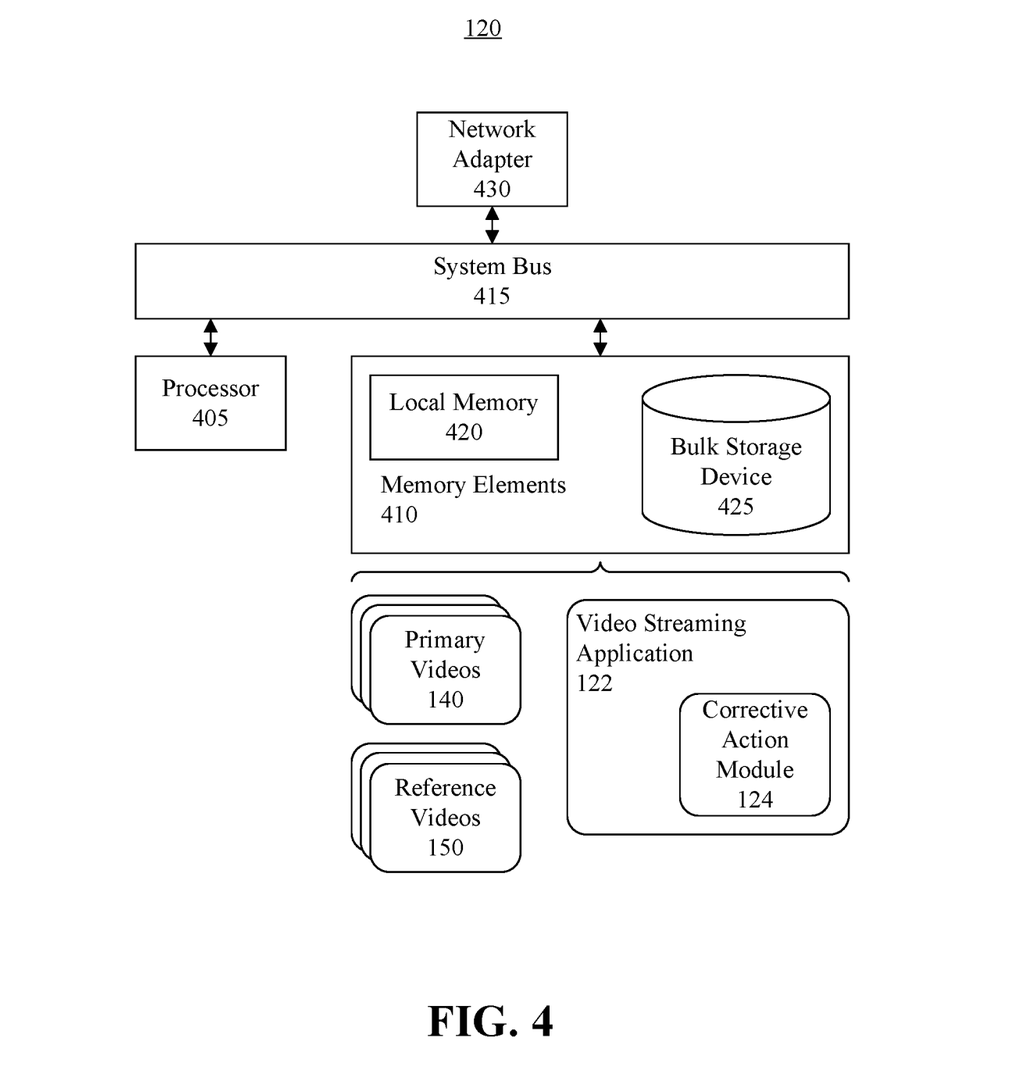
FIG. 4 is a block diagram illustrating example architecture of a video server.

FIG. 4 is a block diagram illustrating example architecture of the video server 120. The video server 120 can include at least one processor 405 coupled to memory elements 410 through a system bus 415 or other suitable circuitry. As such, the video server 120 can store program code within the memory elements 410. The processor 405 can execute the program code accessed from the memory elements 410 via the system bus 415. It should be appreciated that the video server 120 can be implemented in the form of any system including a processor and memory that is capable of performing the functions and/or operations described within this specification.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a HDD, SSD, or other persistent data storage device. The video server 120 also can include one or more cache memories (not shown) that provide temporary storage of at least some program code in order to reduce the number of times program code must be retrieved from the bulk storage device 425 during execution.

One or more network adapters 430 can be coupled to video server 120 to enable video server 120 to become coupled to other systems, such as the video display system 130, and/or remote storage devices through intervening private or public networks. Modems, cable modems, transceivers, and Ethernet cards are examples of different types of network adapters 430 that can be used with video server 120.

As pictured in FIG. 4, the memory elements 410 can store the primary videos 140, the reference videos 150 and the video streaming application 122 which, as noted, can include the corrective action module 124. Being implemented in the form of executable program code, the video streaming application 122 and corrective action module 124 can be executed by the video server 120 and, as such, can be considered part of the video server 120. Moreover, the primary videos 140, reference videos 150, video streaming application 122 and corrective action module 124 are functional data structures that impart functionality when employed as part of the video server 120 of FIG. 4.

Figure 5:
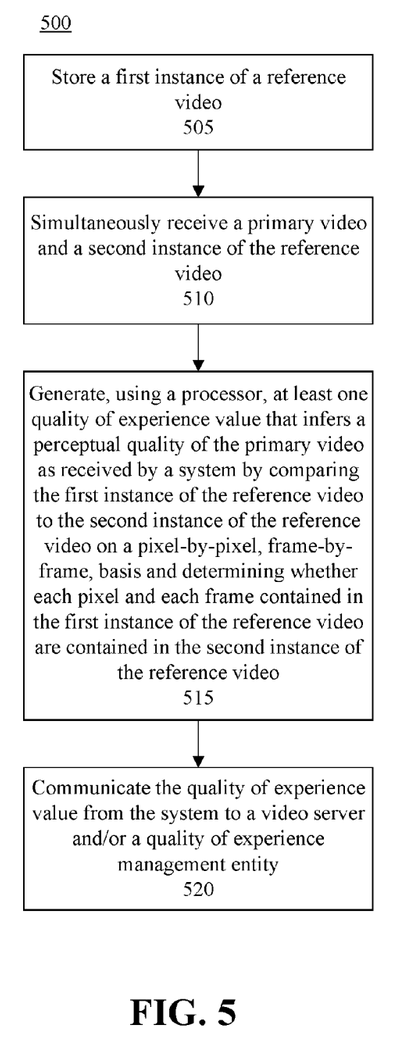
FIG. 5 is a flow chart illustrating an example of a method for generating a QoE value.

FIG. 5 is a flow chart illustrating an example of a method 500 for generating a QoE value. At step 505, a first instance of a reference video can be stored by a video display system comprising at least one processor. At step 510, a primary video and a second instance of the reference video are simultaneously received. At step 515, at least one quality of experience value is generated using a processor. The quality of experience value infers a perceptual quality of the primary video as received by a system by comparing the first instance of the reference video to the second instance of the reference video on a pixel-by-pixel, frame-by-frame, basis and determining whether each pixel and each frame contained in the first instance of the reference video are contained in the second instance of the reference video. At step 520, the quality of experience value can be communicated from the system to a video server and/or a quality of experience management entity.

Figure 6:
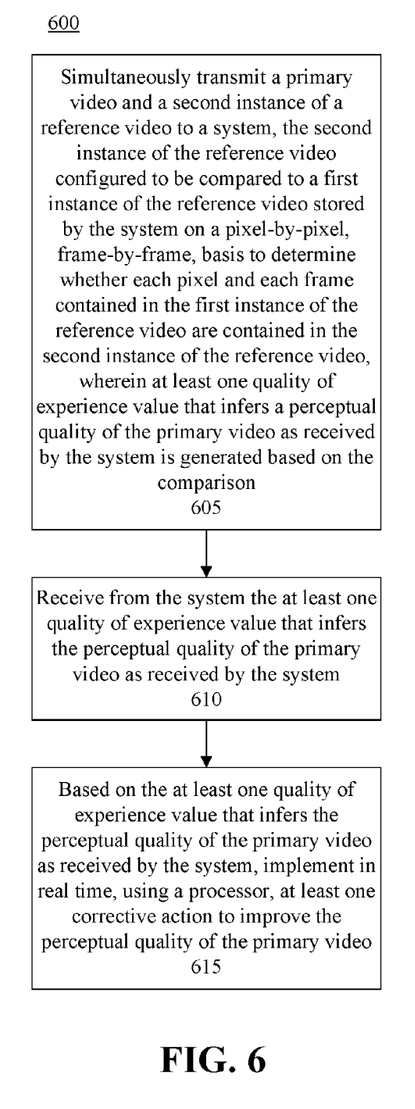
FIG. 6 is a flow chart illustrating an example of a method for processing a QoE value.

FIG. 6 is a flow chart illustrating an example of a method for processing a QoE value. At step 605, a primary video and a second instance of a reference video are simultaneously transmitted to a system. The second instance of the reference video is configured to be compared to a first instance of the reference video stored by the system on a pixel-by-pixel, frame-by-frame, basis to determine whether each pixel and each frame contained in the first instance of the reference video are contained in the second instance of the reference video, wherein at least one quality of experience value that infers a perceptual quality of the primary video as received by the system is generated based on the comparison. At step 610, at least one quality of experience value is received from the system. The quality of experience value infers the perceptual quality of the primary video as received by the system. At step 615, based on the at least one quality of experience value that infers the perceptual quality of the primary video as received by the system, at least one corrective action can be implemented in real time, using a processor, to improve the perceptual quality of the primary video.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
storing a first instance of a reference video;
simultaneously receiving a primary video and a second instance of the reference video; and
generating, using a processor, at least one quality of experience value that infers a perceptual quality of the primary video, with regard to how the content of the primary video is, or would be, subjectively perceived by a user viewing the primary video, as received by a system by comparing the first instance of the reference video to the second instance of the reference video on a pixel-by-pixel, frame-by-frame, basis and determining whether each pixel and each frame contained in the first instance of the reference video are contained in the second instance of the reference video.

2. The method of claim 1, wherein generating, using the processor, the at least one quality of experience value that infers the perceptual quality of the primary video as received by the system further comprises:
identifying frames contained in the first instance of the reference video that are not contained in the second instance of the reference video.

3. The method of claim 1, wherein generating, using the processor, the at least one quality of experience value that infers the perceptual quality of the primary video as received by the system further comprises:
identifying frames contained in the second instance of the reference video that are corrupted.

4. The method of claim 1, wherein generating, using the processor, the at least one quality of experience value that infers the perceptual quality of the primary video as received by the system further comprises:
identifying pixels contained in the first instance of the reference video that are not contained in the second instance of the reference video.

5. The method of claim 1, wherein generating, using the processor, the at least one quality of experience value that infers the perceptual quality of the primary video as received by the system further comprises:
identifying pixels contained in the second instance of the reference video that are corrupted.

6. The method of claim 1, wherein generating, using the processor, the at least one quality of experience value that infers the perceptual quality of the primary video as received by the system further comprises:
for each pixel contained in the first instance of the reference video and in the second instance of the reference video, determining whether a value assigned to the pixel in the first instance of the reference video matches a value assigned to the pixel in the second instance of the reference video.

7. The method of claim 1, wherein simultaneously receiving the primary video and the second instance of the reference video comprises:
receiving a multiplexed data stream comprising the primary video and the second instance of the reference video;
the method further comprising:
de-multiplexing the multiplexed data stream to extract at least the second instance of the reference video from the data stream.

8. The method of claim 1, wherein storing the first instance of the reference video comprises:
storing a first instance of each of a plurality of reference videos, each of the plurality of reference videos corresponding to a respective type of primary video anticipated to be received by the system;
wherein the first instance of the reference video is selected from the plurality of reference videos and the first instance of the reference video corresponds to a type of the primary video.

9. The method of claim 1, further comprising:
receiving a plurality of other instances of the reference video; and
for each of the other instances of the reference video, generating at least one respective quality of experience value that infers the perceptual quality of the primary video as received by the system when a respective instance of the reference video is received.

10. The method of claim 9, wherein a determination of when each of the other instances of the reference video is communicated to the system is made based, at least in part, on at least one previously generated quality of experience value.

11. The method of claim 1, further comprising:
communicating the quality of experience value from the system to a video server or a quality of experience management entity.

12. The method of claim 1, further comprising:
storing the quality of experience value; and
responsive to a polling request received from a video server, communicating at least the quality of experience value from the system to the video server.

13. A method, comprising:
simultaneously transmitting a primary video and a second instance of a reference video to a system, the second instance of the reference video configured to be compared to a first instance of the reference video stored by the system on a pixel-by-pixel, frame-by-frame, basis to determine whether each pixel and each frame contained in the first instance of the reference video are contained in the second instance of the reference video, wherein at least one quality of experience value that infers a perceptual quality of the primary video, with regard to how the content of the primary video is, or would be, subjectively perceived by a user viewing the primary video, as received by the system is generated based on the comparison;

receiving from the system the at least one quality of experience value that infers the perceptual quality of the primary video as received by the system; and based on the at least one quality of experience value that infers the perceptual quality of the primary video as received by the system, implementing in real time, using a processor, at least one corrective action to improve the perceptual quality of the primary video.

14. The method of claim 13, wherein simultaneously transmitting the primary video and the second instance of the reference video to the system comprises:
multiplexing the primary video and the second instance of the reference video into a single data stream.

* * * * *